United States Patent
Castillo

(10) Patent No.: US 12,056,162 B2
(45) Date of Patent: Aug. 6, 2024

(54) CREATING TOOL FOR USE IN CATERING

(71) Applicant: B/E Aerospace, Inc., Winston Salem, NC (US)

(72) Inventor: Arnau Castillo, Utrecht (NL)

(73) Assignee: B/E AEROSPACE, INC., Winston-Salem, NC (US)

( * ) Notice: Subject to any disclaimer, the term of this patent is extended or adjusted under 35 U.S.C. 154(b) by 0 days.

(21) Appl. No.: 17/940,358

(22) Filed: Sep. 8, 2022

(65) Prior Publication Data

US 2023/0081090 A1    Mar. 16, 2023

(30) Foreign Application Priority Data

Sep. 10, 2021  (EP) .................................. 21196111

(51) Int. Cl.
*G06F 16/28*  (2019.01)
*G06Q 50/12*  (2012.01)

(52) U.S. Cl.
CPC ........... *G06F 16/285* (2019.01); *G06Q 50/12* (2013.01)

(58) Field of Classification Search
CPC .............................. G06F 16/285; G06Q 50/12
See application file for complete search history.

(56) References Cited

U.S. PATENT DOCUMENTS

| | | | |
|---|---|---|---|
| 10,162,481 B2 | 12/2018 | Robberechts et al. | |
| 11,751,712 B2 * | 9/2023 | Baldwin | A47J 36/321 |
| | | | 99/330 |
| 2009/0287644 A1 * | 11/2009 | Crosby | G16H 20/60 |
| 2012/0136864 A1 | 5/2012 | Ochtel | |
| 2013/0007615 A1 | 1/2013 | Goldman | |
| 2013/0149675 A1 * | 6/2013 | Slone | A47J 36/321 |
| | | | 434/127 |
| 2013/0149676 A1 * | 6/2013 | Tokuda | A47J 36/321 |
| | | | 434/127 |
| 2013/0149677 A1 * | 6/2013 | Slone | G09B 19/0092 |
| | | | 434/127 |
| 2013/0222406 A1 * | 8/2013 | Wolfe | G06Q 30/0241 |
| | | | 345/582 |
| 2017/0139385 A1 * | 5/2017 | Young | A47J 27/04 |
| 2020/0069103 A1 * | 3/2020 | Baldwin | A47J 36/321 |
| 2022/0257043 A1 * | 8/2022 | Baldwin | A47J 27/10 |
| 2023/0081090 A1 * | 3/2023 | Castillo | G06Q 30/06 |
| | | | 707/737 |

OTHER PUBLICATIONS

European Search Report for Application No. 21196111.5, mailed Feb. 23, 2022, 8 pages.

* cited by examiner

*Primary Examiner* — Eliyah S. Harper
(74) *Attorney, Agent, or Firm* — CANTOR COLBURN LLP

(57) ABSTRACT

A method of pairing foods, performed on a smart device includes combining data from at least two of: a food pairing database, which comprises data based on taste profiles of said foods, a food heating profile database, which comprises data based on a length of time said foods require in order to be cooked, and a taste correction at altitude database, which comprises data based on a taste of said food at a particular altitude, and comparing said data, and outputting an optimized pairing of foods, based on one or more of taste, heating time and taste at altitude.

15 Claims, No Drawings

CREATING TOOL FOR USE IN CATERING

CROSS-REFERENCE TO RELATED APPLICATIONS

This application claims priority to European Patent Application No. 21196111.5 filed Sep. 10, 2021, the entire contents of which is incorporated herein by reference.

FIELD

The examples described herein relate to a creative tool for use in catering.

BACKGROUND

Some of the "world top 50" and Michelin starred restaurants use different techniques to improve their team creativity. Some airline catering companies hire chefs or other personnel to create their menus and other food offerings.

Food pairing is a scientific method that is used to classify ingredients based on their aroma profile to find the best matches between all of them, such matches perhaps not having been expected beforehand. The level of creative tools that are used by such caterers are, however, quite rudimentary. For example, if a chef wished to make a chicken dish, they may refer to the database provided by "foodpairing.com" and this would give the most likely ingredients to match based on their flavour.

SUMMARY

A method of pairing foods, performed on a smart device, is described herein, said method comprising, on the smart device: combining data from at least two of: a food pairing database, which comprises data based on taste profiles of said foods, a food heating profile database, which comprises data based on a length of time said foods require in order to be cooked, and a taste correction at altitude database, which comprises data based on a taste of said food at a particular altitude, and comparing said data, and outputting an optimized pairing of foods, based on one or more of taste, heating time and taste at altitude.

The method may further comprise combining data from said food pairing database with at least one of the other said databases, and may further comprise: providing a taste profile input to said smart device, said taste profile input relating to a taste profile and indicating whether said food should be at least one of salty, crunchy, sweet, savory, said method further comprising g providing and/or based upon a particular ingredient. The smart device may further be configured to consult said food pairing database and determine and select foods to be paired with each other in order to provide the inputted taste profile.

The method of may further comprise combining data from said taste correction at altitude database with at least said food pairing database, and providing an altitude input to said smart device, said altitude input relating to an altitude at which the food is to be consumed and wherein said smart device is configured to consult said taste correction at altitude database to determine which taste corrections are required for the foods that have been selected from said food pairing database at the particular altitude that has been inputted.

The method may further comprise providing a heating profile input to said smart device, said heating profile input relating to a heating profile of said food; and said smart device may be configured to consult said food heating profile database and combine information from said food heating profile database with foods selected from said food pairing database, and further configured to output an optimized heating time based on said inputted information.

The method may further comprise combining data from all three of said i) food pairing database, ii) said heating profile database and iii) said taste correction at altitude database. The method may further comprise: providing said food pairing input, an altitude input and a heating profile input to said smart device. Said smart device may be further configured to consult said food pairing database, said food heating profile database and said taste correction at altitude database and combine information from all three of said databases to output one or all of: an optimized heating time; an optimized food pairing and an optimized taste correction, based on said inputted information.

A non-transitory computer readable storage medium and a processor are also described herein, configured to, by a control app installed on a smart device, combine data from at least two of i) a food pairing database, which comprises data based on taste profiles of said foods, ii) a food heating profile database, which comprises data based on a length of time said foods require in order to be cooked, and iii) a taste correction at altitude database, which comprises data based on a taste of said food at a particular altitude, and compare said data, and output an optimized pairing of foods, based on one or more of taste, heating time and taste at altitude:

The processor may be configured to combine data from said food pairing database with at least one of the other said databases, and said processor may be configured to receive a taste profile input, said taste profile input relating to a taste profile and indicating whether said food should be at least one of salty, crunchy, sweet, savory, said method further comprising providing and/or based upon a particular ingredient. The processor may be configured to consult said food pairing database to determine and select foods to be paired with each other in order to provide the inputted taste profile.

The processor may be configured to combine data from said taste correction at altitude database with at least said food pairing database, and may be configured to receive an altitude input, said altitude input relating to an altitude at which the food is to be consumed. The processor may be configured to consult said taste correction at altitude database and determine which taste corrections are required for the foods that have been selected from said food pairing database at the particular altitude that has been inputted.

The processor may be configured to receive a heating profile input, said heating profile input relating to a heating profile of said food. The processor may be configured to consult said food heating profile database and combine information from said food heating profile database with foods selected from said food pairing database, and may further be configured to output an optimized heating time based on said inputted information.

The processor may be configured to combine data from all three of said i) food pairing database, ii) said heating profile database and iii) said taste correction at altitude database; said processor may be configured to receive said food pairing input, an altitude input and a heating profile input. The processor may be further configured to consult said food pairing database, said food heating profile database and said taste correction at altitude database and combine information from all three of said databases to output one or all of: an optimized heating time; an optimized food pairing and an optimized taste correction, based on said inputted information.

A system comprising a smart device is also described herein, wherein the smart device contains computer-executable instructions to combine data from at least two of: i) a food pairing database, which comprises data based on taste profiles of said foods, ii) a food heating profile database, which comprises data based on a length of time said foods require in order to be cooked, and iii) a taste correction at altitude database, which comprises data based on a taste of said food at a particular altitude, and compare said data, and output an optimized pairing of foods, based on one or more of taste, heating time and taste at altitude.

The computer-executable instructions may combine data from said food pairing database with at least one of the other said databases, and, based on a taste profile input, said taste profile input relating to a taste profile and indicating whether said food should be at least one of salty, crunchy, sweet, savory, said method further comprising providing and/or based upon a particular ingredient; said computer-executable instructions may be configured to consult said food pairing database and determine and select foods to be paired with each other in order to provide the inputted taste profile.

The computer-executable instructions may be configured to combine data from said taste correction at altitude database with at least said food pairing database, and wherein, based on an altitude input, said altitude input relating to an altitude at which the food is to be consumed, said computer-executable instructions are configured to consult said taste correction at altitude database and determine which taste corrections are required for the foods that have been selected from said food pairing database at the particular altitude that has been inputted.

Based on a heating profile input, said heating profile input relating to a heating profile of said food; said computer-executable instructions may be configured to consult said food heating profile database and combine information from said food heating profile database with foods selected from said food pairing database and further configured to output an optimized heating time based on said inputted information.

The computer-executable instructions may be configured to combine data from all three of said i) food pairing database, ii) said heating profile database and iii) said taste correction at altitude database; and based on said food pairing input, an altitude input and a heating profile input, said computer-executable instructions are configured to consult said food pairing database, said food heating profile database and said taste correction at altitude database and combine information from all three of said databases to output one or all of: an optimized heating time; an optimized food pairing and an optimized taste correction, based on said inputted information.

DETAILED DESCRIPTION

The present disclosure relates to a method that can be performed on, and by, a smart device, such as a smart phone, a tablet, or computer, for example. Other smart devices not listed here may also be envisaged. The present disclosure also relates to a system that performs that method. The creative tool that performs this method may be installed or installable on the smart device in the form of an app, or other computer-based program.

The creative tool may be provided in the form of an app, on a smart device, which is configured to perform a method of pairing foods. An algorithm is used to combine data from: a food pairing database, a food heating profile database and a taste correction database. The creative tool compares the data from all three databases and outputs an optimized pairing of the foods, based on their taste, heating time and taste at a particular altitude.

The food pairing database may be a database such as that provided by "foodpairing.com", which comprises data based on the taste profiles of different foods. Such databases provide the taste profiles of ingredients and combine them by taste.

The food heating profile database may comprise data based on the length of time that different foods require in order to be cooked, or heated. This may provide the heat profile of the ingredients, giving heating times, water retention capability (taste retention) etc.

The taste correction at altitude database may comprise data based on the taste of the food at a particular altitude. For example, due to the differences in air pressure, as well as humidity etc. a food which tastes salty at sea level altitude may not taste salty at an aircraft cruising altitude and so the food may require additional salt to be added, based on the altitude at which it is being consumed. The air pressure can affect a person's taste buds by reducing the salt detection by 25 percent and the sweetness by 15 percent, for example.

A non-transitory computer readable storage medium and a processor could also be used, wherein the processor is configured to, by the app installed on a smart device, combine data from the three databases discussed above.

A system comprising a smart device may also be provided wherein the smart device contains computer-executable instructions to combine the data from the three databases discussed above.

The method may comprise a user providing an input into the smart device. The input may comprise information relating to a particular taste profile that is required. For example, the user may provide an input indicating that the food should be salty, crunchy, sweet, savory etc. or they could input a particular ingredient around which they desire to build a recipe, e.g. turkey, tuna etc.

The user may then provide another input into the smart device. This input may comprise the altitude at which the food is to be consumed. For example, a flight cruising altitude.

The user may also provide another input into the smart device. This input may comprise a heating profile. For example, the user may provide an input stating that the food should be cooked for 20 minutes or less.

The creative tool provided on the smart device is configured to receive these inputs and connect with the food pairing database to determine which foods can be paired to provide the inputted requirements such as sweet etc. as discussed above.

The creative tool also connects with the taste correction database and is configured to determine which taste corrections are required for the foods that have been selected from the food pairing database at the particular altitude that has been inputted.

The creative tool also connects with the food heating profile database and combine the information from that database with the foods selected from the food pairing database and altitude database, in order to optimize the heating time for those that have been selected.

The creative tool therefore provides the chef not only with the optimal ingredients that fit by flavor at a particular altitude but also the ones that heat up faster. This is important for aircraft, where perhaps hundreds of meals may have to be heated within a short space of time. The creative tool also takes into account and corrects for the effects of pressure on the taste buds of the tongue. The creative tool also ensures that not only is the food cooked within the correct timeframe, but also that it is not undercooked or overcooked.

The creative tools described herein support the creative process of a chef. In some examples, once the user has provided the relevant inputs into the tool, the data may be used by the creative tool to automatically generate a specific cooking program based on the optimization of the input data. In some examples, the creative tool may comprise means to send that optimized cooking program electronically to an oven. The oven may therefore comprise a means for receiving that input and then cooking the food based on that optimized program.

The examples provided herein unify creative tools with business knowledge to create a new service and market that can be used by caterers, and in particular, caterers for an aircraft. The examples described herein therefore could be sold to and used by any or all catering company, as well as airline departments that design in-flight meals.

The invention claimed is:

1. A method of pairing foods for an in-flight meal on an aircraft with a smart device,
said method comprising, on the smart device:
combining data from a taste correction at altitude database, which comprises data based on a taste of said food at a particular altitude and at least one of:
i) a food pairing database, which comprises data based on taste profiles of said foods, and
ii) a food heating profile database, which comprises data based on a length of time said foods require in order to be cooked, and
comparing said data, and
outputting an optimized pairing of foods, based on one or more of taste, heating time and taste at altitude.

2. The method of claim 1,
further comprising: providing a taste profile input to said smart device, said taste profile input relating to a taste profile and indicating whether said food should be at least one of salty, crunchy, sweet, savory;
and wherein said smart device is configured to consult said food pairing database and determine and select foods to be paired with each other in order to provide the inputted taste profile.

3. The method of claim 2, wherein said method comprises combining data from said taste correction at altitude database with at least said food pairing database,
and providing an altitude input to said smart device, said altitude input relating to an altitude at which the food is to be consumed and wherein said smart device is configured to consult said taste correction at altitude database to determine which taste corrections are required for the foods that have been selected from said food pairing database at the particular altitude that has been inputted.

4. The method of claim 2, wherein said method further comprises:
providing a heating profile input to said smart device, said heating profile input relating to a heating profile of said food;
and wherein said smart device is configured to:
consult said food heating profile database and combine information from said food heating profile database with foods selected from said food pairing database; and
to output an optimized heating time based on said inputted information.

5. The method of claim 2, wherein said method comprises combining data from said taste correction at altitude database with both of said i) food pairing database, and ii) said heating profile database;
the method further comprising:
providing said food pairing input, an altitude input and a heating profile input to said smart device;
wherein said smart device is further configured to consult said food pairing database, said food heating profile database and said taste correction at altitude database and combine information from all three of said databases to output one or all of: an optimized heating time; an optimized food pairing and an optimized taste correction, based on said inputted information.

6. A non-transitory computer readable storage medium and a processor configured to, by a control app installed on a smart device,
combine data from a taste correction at altitude database, which comprises data based on a taste of said food at a particular altitude and at least one of:
i) a food pairing database, which comprises data based on taste profiles of said foods, and
ii) a food heating profile database, which comprises data based on a length of time said foods require in order to be cooked, and
compare said data, and
output an optimized pairing of foods, based on one or more of taste, heating time and taste at altitude.

7. The non-transitory computer readable storage medium and processor of claim 6, wherein the processor is configured
to receive a taste profile input, said taste profile input relating to a taste profile and indicating whether said food should be at least one of salty, crunchy, sweet, savory, said method further comprising providing and/or based upon a particular ingredient, and
wherein said processor is configured to consult said food pairing database to determine and select foods to be paired with each other in order to provide the inputted taste profile.

8. The non-transitory computer readable storage medium and processor of claim 7, wherein said processor is configured to:
combine data from said taste correction at altitude database with at least said food pairing database; and
receive an altitude input, said altitude input relating to an altitude at which the food is to be consumed and wherein processor is configured to consult said taste correction at altitude database and determine which taste corrections are required for the foods that have been selected from said food pairing database at the particular altitude that has been inputted.

9. The non-transitory computer readable storage medium and processor of claim 7, wherein said processor is configured to:
receive a heating profile input, said heating profile input relating to a heating profile of said food;
consult said food heating profile database and combine information from said food heating profile database with foods selected from said food pairing database; and
output an optimized heating time based on said inputted information.

10. The non-transitory computer readable storage medium and processor of claim 7, wherein processor is configured to combine data from said taste correction at altitude database with both of said i) food pairing database, and ii) said heating profile database;
- wherein said processor is configured to receive said food pairing input, an altitude input and a heating profile input;
- wherein said processor is further configured to consult said food pairing database, said food heating profile database and said taste correction at altitude database and combine information from all three of said databases to output one or all of: an optimized heating time; an optimized food pairing and an optimized taste correction, based on said inputted information.

11. A system comprising:
- a smart device,
- wherein the smart device contains computer-executable instructions to combine data from a taste correction at altitude database, which comprises data based on a taste of said food at a particular altitude with at least one of:
- i) a food pairing database, which comprises data based on taste profiles of said foods, and
- ii) a food heating profile database, which comprises data based on a length of time said foods require in order to be cooked, and
- compare said data, and
- output an optimized pairing of foods, based on one or more of taste, heating time and taste at altitude.

12. The system of claim 11,
- wherein, based on a taste profile input, said taste profile input relating to a taste profile and indicating whether said food should be at least one of salty, crunchy, sweet, savory, said method further comprising providing and/or based upon a particular ingredient;
- said computer-executable instructions are configured to consult said food pairing database and determine and select foods to be paired with each other in order to provide the inputted taste profile.

13. The system of claim 12, wherein said computer-executable instructions are configured to combine data from said taste correction at altitude database with at least said food pairing database,
- wherein, based on an altitude input, said altitude input relating to an altitude at which the food is to be consumed, said computer-executable instructions are configured to consult said taste correction at altitude database and determine which taste corrections are required for the foods that have been selected from said food pairing database at the particular altitude that has been inputted.

14. The system of claim 12 wherein, based on a heating profile input, said heating profile input relating to a heating profile of said food;
- said computer-executable instructions are configured to consult said food heating profile database and combine information from said food heating profile database with foods selected from said food pairing database:
- and further configured to output an optimized heating time based on said inputted information.

15. The system of claim 12, wherein said computer-executable instructions are configured to:
- combine data from said taste correction at altitude database with both of said i) food pairing database, and ii) said heating profile database and iii) said taste correction at altitude database; and
- based on said food pairing input, an altitude input and a heating profile input, consult said food pairing database, said food heating profile database and said taste correction at altitude database and combine information from all three of said databases to output one or all of: an optimized heating time; an optimized food pairing and an optimized taste correction, based on said inputted information.

* * * * *